(12) United States Patent
Sun et al.

(10) Patent No.: US 9,082,181 B2
(45) Date of Patent: Jul. 14, 2015

(54) IMAGE PROCESSING METHOD AND APPARATUS

(71) Applicant: FUJITSU LIMITED, Kawasaki-shi, Kanagawa (JP)

(72) Inventors: Jun Sun, Beijing (CN); Yifeng Pan, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 13/875,376

(22) Filed: May 2, 2013

(65) Prior Publication Data
US 2013/0294696 A1 Nov. 7, 2013

(30) Foreign Application Priority Data
May 4, 2012 (CN) .......................... 2012 1 0137925

(51) Int. Cl.
*G06K 9/18* (2006.01)
*G06T 7/00* (2006.01)
*G06K 9/00* (2006.01)

(52) U.S. Cl.
CPC ............ *G06T 7/004* (2013.01); *G06K 9/00442* (2013.01)

(58) Field of Classification Search
USPC ......................................................... 382/182
See application file for complete search history.

(56) References Cited

U.S. PATENT DOCUMENTS 6,151,423 A * 11/2000 Melen ............................ 382/289
7,136,082 B2 * 11/2006 Saund et al. ................... 345/619
2009/0274392 A1   11/2009 Fan et al.
2010/0296730 A1 * 11/2010 Matsuoka ...................... 382/166
2012/0045129 A1 *  2/2012 Sun et al. ....................... 382/176
2013/0304604 A1 * 11/2013 Hoffman et al. ............. 705/26.5

FOREIGN PATENT DOCUMENTS

CN      101833648      9/2010
CN      102375988      3/2012

OTHER PUBLICATIONS

Lienhart et al., "Localizing and Segmenting Text in Images and Videos", IEEE Transactions on Circuits and Systems for Video Technology, vol. 12, No. 4, Apr. 2002, pp. 256-26.*
Extended European Search Report dated Aug. 27, 2014 in corresponding European Patent Application No. 13159767.6.
Ye et al., "Fast and robust text detection in images and video frames", Image and Vision Computing, 23, 2005, pp. 565-576.

(Continued)

*Primary Examiner* — Gregory F Cunningham
(74) *Attorney, Agent, or Firm* — Staas & Halsey LLP (57) ABSTRACT

An image processing method and apparatus is provided. The image processing method includes steps of: generating a first scale binary image from an image, wherein the first scale is smaller than the original scale of the image; detecting at least one text line in the image based on the first scale binary image; generating a second scale binary image from the image, wherein the second scale is larger than the first scale; for each text line, calculating a similarity between corresponding sections in the first scale binary image and the second scale binary image, and removing the text line for which the similarity is lower than a predetermined level; for one or more of the remaining text line(s), performing OCR on corresponding section(s) in the second scale binary image to determine character orientation(s) of corresponding text line(s); and determining the orientation of the image according to the determined character orientation(s).

9 Claims, 6 Drawing Sheets

(56) References Cited

OTHER PUBLICATIONS

Lienhart et al., "Localizing and Segmenting Text in Images and Videos", IEEE Transactions on Circuits and Systems for Video Technology, vol. 12, No. 4, Apr. 2002, pp. 256-268.
Liu et al., "Multiscale Edge-Based Text Extraction From Complex Images", IEEE, ICME, 2006, pp. 1721-1724.
J. Sauvola et al., "Adaptive document image binarization", Pattern Recognition, 33, pp. 225-236, 2000.
Kwang In Kim et al., "Texture-Based Approach for Text Detection in Images Using Support Vector Machines and Continuously Adaptive Mean Shift Algorithm", IEEE Transactions on Pattern Analysis and Machine Intelligence, vol. 25, No. 12, Dec. 2003, pp. 1631-1639.
Yi-Feng Pan et al., "Text Localization in Natural Scene Images based on Conditional Random Field", $10^{th}$ International Conference on Document Analysis and Recognition, 2009, pp. 6-10.
Kaleem Siddiqi et al., "Shock Graphs and Shape Matching", International Journal of Computer Vision, 30, 1, 1999, pp. 1-35.
Xiangrong Chen et al., "Detecting and Reading Text in Natural Scenes", IEEE, 2004, 8 pages.
Serge Belongie et al., "Shape Context: A new descriptor for shape matching and object recognition", Department of Electrical Engineering and Computer Sciences, University of California at Berkeley, 7 pages, 2001.
Ranjith Unnikrishnan and Ray Smith, "Combined Script and Page Orientation Estimation using the Tesseract OCR engine", Google Inc., 7 pages, 2009.

* cited by examiner

IMAGE PROCESSING METHOD AND APPARATUS

CROSS REFERENCE TO RELATED APPLICATIONS

The application is based upon and claims the benefit of priority of the prior Chinese Patent Application No. 201210137925.1, filed on May 4, 2012 and entitled "Image processing method and apparatus", the entire contents of which are incorporated herein by reference.

FIELD OF THE INVENTION

The present invention generally relates to image processing, and more specifically to a method and apparatus for recognizing the orientation of a document image.

BACKGROUND OF THE INVENTION

When a document image, such as a scanned page, is processed, the document image acquired by an image input equipment such as a scanner or a camera may be rotated relative to its actual orientation, for example, by an angle of 90°, 180° or 270°. Therefore, it is necessary to recognize the orientation of the document image. Examples of the method for recognizing the orientation of the document image are given in the following literatures:

Ranjith Unnikrishnan, "Combined Script and Page Orientation Estimation using the Tesseract OCR engine", ICDAR2009;

Xin Wan, "Method for correcting text image", CN 101833648 A; and

Zhigang Fan, "Page orientation detection based on selective character recognition", US 2009/0274392 A1.

SUMMARY OF THE INVENTION

The object that conventional methods aim at is mainly a relatively standard document image. However if the document image to be processed is a mixture of image and text or is mainly an image, the processing results of the above-mentioned methods are unsatisfactory.

The present invention provides a method and apparatus for recognizing the orientation of a document image, which can rapidly determine the orientation of the whole document image with high accuracy.

According to an embodiment of the present invention, an image processing method includes steps of: generating a first scale binary image from an image, in which the first scale is smaller than the original scale of the image; detecting at least one text line in the image based on the first scale binary image; generating a second scale binary image from the image, in which the second scale is larger than the first scale; for each text line, calculating a similarity between a corresponding section in the first scale binary image and a corresponding section in the second scale binary image, and removing the text line for which the similarity is lower than a predetermined level as noise; for one or more of the remaining text line(s), performing optical character recognition on corresponding section(s) in the second scale binary image to determine character orientation(s) of corresponding text line(s); and determining the orientation of the image according to the determined character orientation(s).

According to another embodiment of the present invention, an image processing apparatus includes: a first scale binary image generating section configured to generate a first scale binary image from an image, in which the first scale is smaller than the original scale of the image; a text line detecting section configured to detect at least one text line in the image based on the first scale binary image; a second scale binary image generating section configured to generate a second scale binary image from the image, in which the second scale is larger than the first scale; a noise removing section configured to, for each text line, calculate a similarity between a corresponding section in the first scale binary image and a corresponding section in the second scale binary image, and remove the text line for which the similarity is lower than a predetermined level as noise; an optical character recognition section configured to perform optical character recognition on corresponding section(s) in the second scale binary image to determine character orientation(s) of the corresponding text line(s); and an image orientation determining section configured to determine the orientation of the image according to the determined character orientation(s).

BRIEF DESCRIPTION OF THE DRAWINGS

The above and other purposes, features and advantages of the present invention can be better understood by reference to the following description for embodiments of the present invention in conjunction with the accompanying drawings. In order to avoid obscuring the present invention due to unnecessary details, only apparatus structures and/or processing steps which are closely related to the technical solution according to the present invention are shown in the accompanying drawings, and other details not closely related to the present invention are omitted.

DETAILED DESCRIPTION OF THE INVENTION

In the following, embodiments according to the present invention will be explained by reference to the accompanying drawings. It should be noted that, for purpose of clarity, representations and descriptions for processes and components which are unrelated to the present invention and known by those skilled in the art are omitted in the accompanying drawings and the specification.

Figure 1:
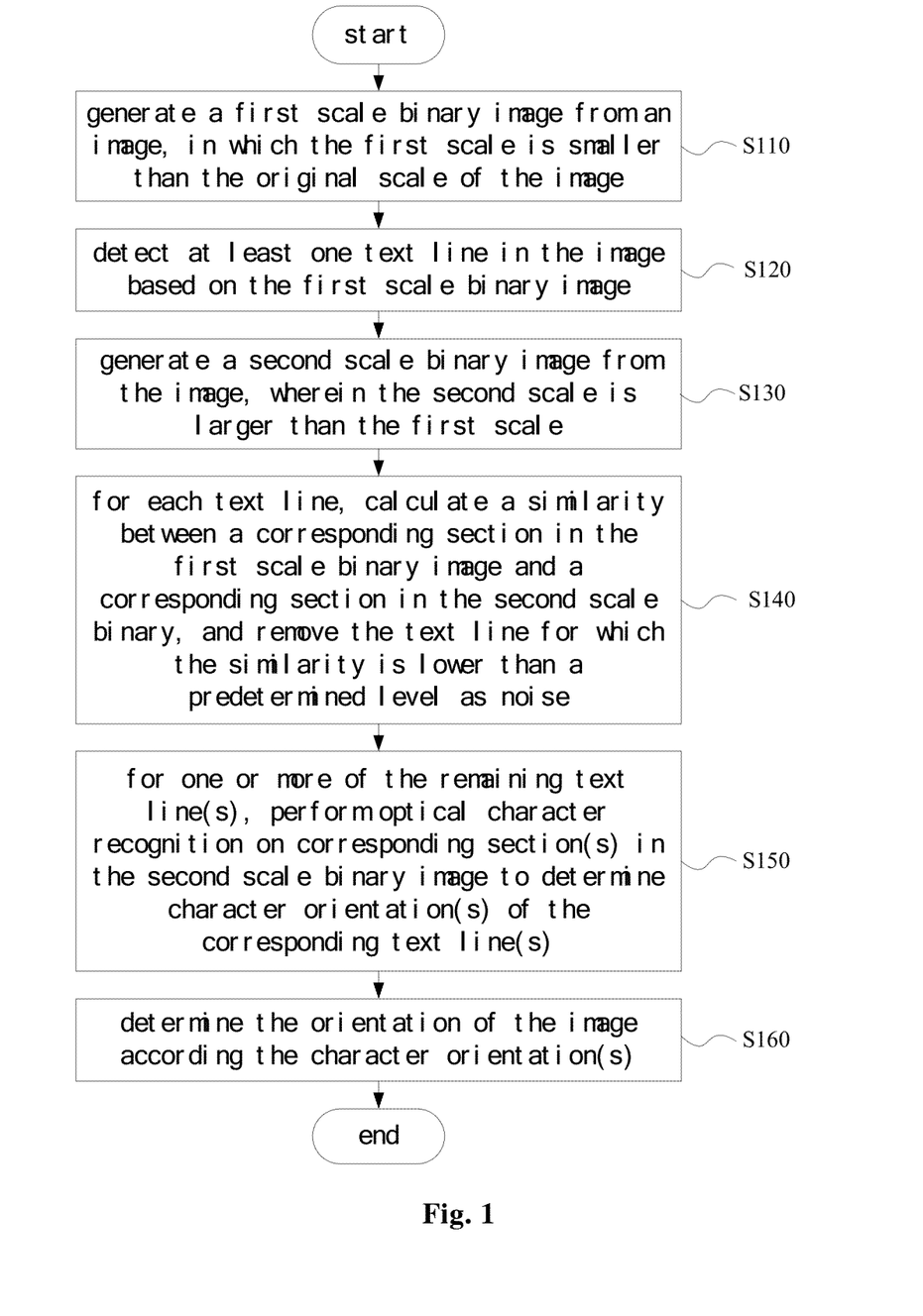
FIG. 1 is a flowchart of an image processing method according to an embodiment of the present invention.

In the following, a procedure of the image processing method according to an embodiment of the present invention will be described by reference to the flowchart in FIG. 1.

In step S110, a first scale binary image is generated from an image, in which the first scale is smaller than the original scale of the image.

Herein, the scale of a image refers to image size in pixels, wherein a large scale corresponds to high resolution and a small scale corresponds to low resolution. The first scale binary image may be generated by performing down sampling and binarization on a grayscale image of the processing object image. Wherein, the image may be down sampled in several ways. For example, the image may be reduced to an image with a scale of 1/N of its original scale or to an image with a specified scale. In addition, the binarization process for the image may be performed by several existing methods, for example:

Otsu method (http://en.wikipedia.org/wiki/Otsu's_method); or the method described in J. Sauvola, M. Pietikainen, "Adaptive document image binarization", Pattern Recognition 33, 2000, pp. 225-236.

Next, in step S120, at least one text line in the image is detected based on the first scale binary image.

One purpose of detecting the text line based on a small scale binary image is to improve the speed of the text line detection.

Figure 2A:
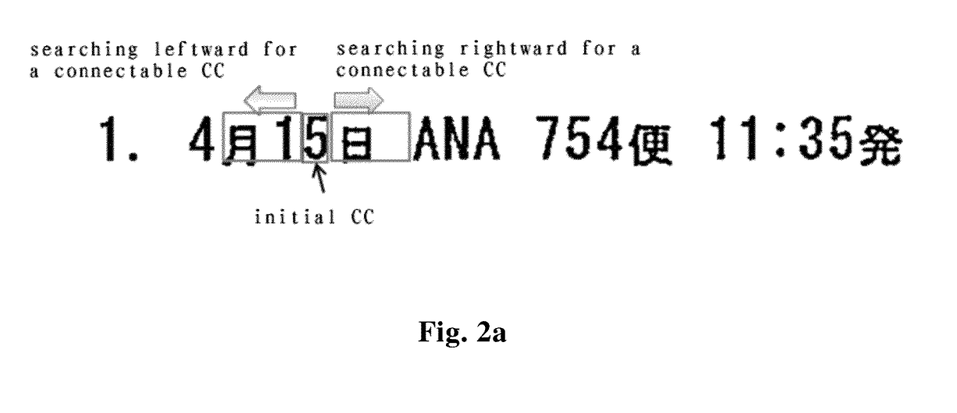
FIGS. 2a and 2b are schematic diagrams showing an example of a text line detection.
Figure 2B:
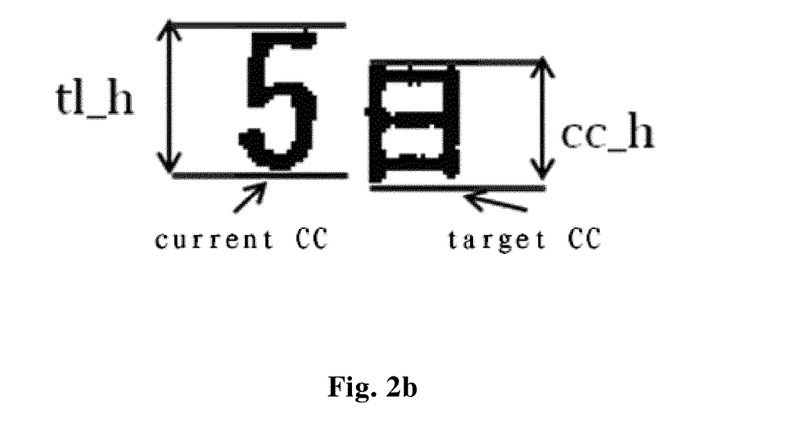

The text line in the image may be detected based on a binary image by various kinds of existing methods in the art. An exemplary way will be described in conjunction with FIG. 2 in the following.

First, connection components (CCs) in the binary image are found out by a CC analysis, and the CCs which apparently do not pertain to a character may be filtered out according to the sizes of the CCs. Then, potential horizontal text lines and vertical text lines are detected based on the filtered CCs. Take the detection of the horizontal text line as an example, as shown in FIG. 2, a certain CC may be selected as an initial CC, and a search is performed leftward and rightward respectively with the size of the initial CC being the size of an initial text line. The search range may be determined by the height of the current text line. For example, the height of the search may be set as the height tl_h of the initial CC and the width of the search may be set as 2×tl_h. If there is an target CC in the search range, an coincidence degree between the projection of the target CC and the projection of the current text line in the horizontal direction (e.g. in FIG. 2b, the proportion of the coinciding section of the projections of tl_h and cc_h in the horizontal direction) is compared. If the coincidence degree is in a predetermined range, a candidate CC is added into the current text line and the range of the text line is updated, and the search is continuously performed leftward or rightward until there is no CC meeting the condition in the search range. In addition, the detection of the vertical text line may also be achieved in a similar way.

It should be understood that the way for detecting the text line applicable in the method and apparatus according to the present invention is not limited to a specific way mentioned above, other existing methods in the art can also be employed, such as a projection based method and a texture based method.

In addition, when the horizontal text line and vertical text line are detected respectively based on the first scale binary image, the following case may occur that CCs in a certain area is detected as both a section of the horizontal text line and a section of the vertical text line, that is, some of the detected horizontal test lines and vertical text lines overlap with each other. Obviously, in this case, one type of the text lines are probably noise text lines.

Figure 3A:
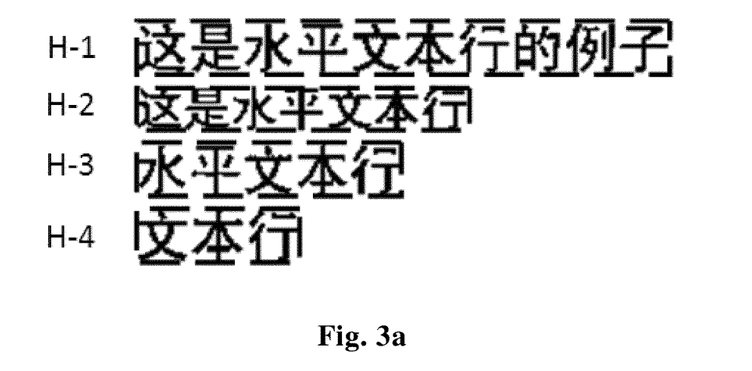
FIGS. 3a to 3c are schematic diagrams showing an example of determining a noise text line based on a text block orientation of an overlapping section in a case that a horizontal text line is overlap with a vertical text line.
Figure 3B:
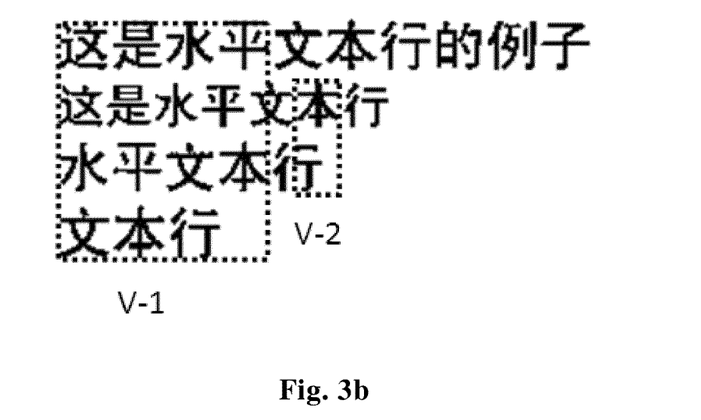
Figure 3C:
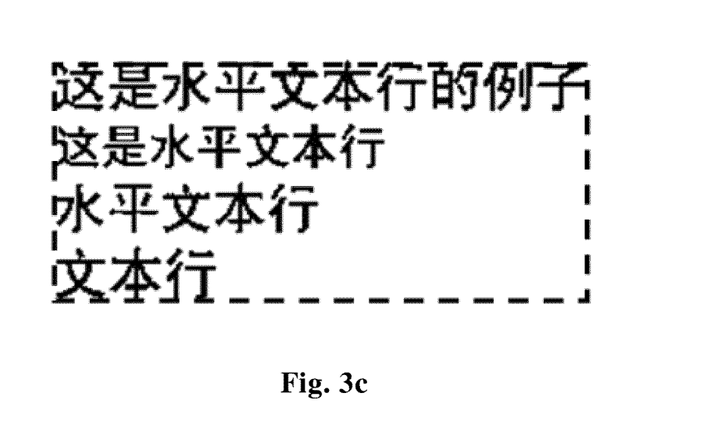

For this case, the image processing method according to an embodiment of the present invention may include steps of: detecting a text block orientation of the overlapping area based on the first scale binary image, and removing as noise the text line whose orientation is inconsistent with the text block orientation. For example, as shown in FIGS. 3a to 3b, for a same area, horizontal text lines H-1 to H-4 (as shown in FIG. 3a) and vertical text lines V-1 and V-2 (as shown in FIG. 3b) are obtained respectively by the detection of the horizontal text line and the detection of the vertical text line. In this case, the text block orientation (i.e. the horizontal orientation or the vertical orientation) of the overlapping area (as shown in FIG. 3c) may be determined by existing methods, such as a projection based method or the method described in CN102375988A, and the text line whose orientation is inconsistent with the text block orientation is removed as noise. In the shown example, in a case that the text block orientation in FIG. 3c is determined as the horizontal orientation, the vertical text lines V-1 and V-2 shown in FIG. 3b are recognized as noises.

Moreover, in addition to the above case that the horizontal text line overlaps with the vertical text line, there may be other types of noise text lines due to reasons such as a background noise. Therefore, according to an embodiment of the present invention, the step of detecting the text line based on the first scale binary image may further include: estimating, based on the first scale binary image, the confidence of the text line using a texture based method and/or a binary projection method, and removing as noise the text line whose confidence is lower than a predetermined level.

Wherein, the texture based method, for example, may be a grayscale-image-based noise text removing method described in Xiangrong Chen, Alan L. Yuille: Detecting and Reading Text in Natural Scenes. CVPR (2) 2004: 366-373, in which whether there is character(s) or a background noise in an image block is determined using the texture characteristic in the grayscale image. In addition, other methods may also be employed to estimate the confidence of a text line based on the texture characteristic, such as a method described in K. I. Kim, et, al. "Texture-Based Approach for Text Detection in Images Using Support Vector Machines and Continuously Adaptive Mean Shift Algorithm", IEEE Transaction on Pattern Analysis and Machine Intelligence, v25, n12, 2003, pp 1631-1639, or in Y. E Pan, et, al. "Text Localization in Natural Scene Images based on Conditional Random Field", International Conference on Document Analysis and Recognition, pp. 6-10.

Figure 4A:
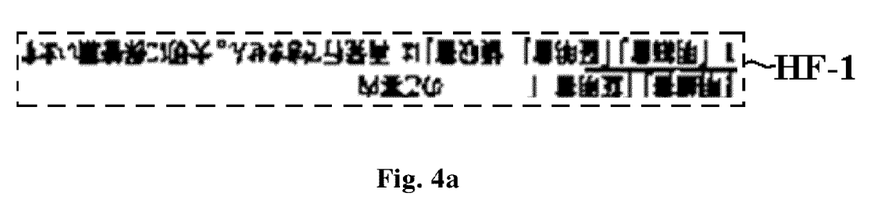
FIGS. 4a and 4b are schematic diagrams respectively showing examples of recognizing a noise text line by using a pixel projection and a stroke projection based on a binary image.
Figure 4B:
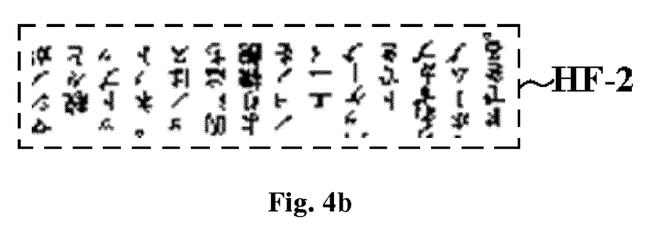

On the other hand, the binary projection method is performed on the basis of the binary image, in which a noise text line is determined using a pixel projection and/or a stroke projection in horizontal direction or vertical direction. FIGS. 4a and 4b are schematic diagrams respectively showing examples of recognizing a noise text line by using a pixel projection and a stroke projection based on a binary image. The noise text line HF-1 shown in FIG. 4a that actually contains two lines of characters is incorrectly recognized as a single text line. In this case, by performing on the text line HF-1 a black pixel projection along the horizontal direction, it can be determined whether the text line HF-1 is a noise text line according to the black pixel distribution characteristic (e.g. for HF-1, in the black pixel distribution, there may be an obvious wave trough between the two lines of characters actually contained in HF-1). In addition, the noise text line HF-2 shown in FIG. 4b is incorrectly recognized as one horizontal text line, while the noise text line HF-2 actually contains multiple vertical text lines, wherein each vertical text line is incorrectly regarded as a single character. In this case, the stroke projection along the vertical direction may be used to count an average number of strokes. Since the number of strokes of a vertical text line is significantly larger than the number of strokes of a single character, the noise text line resulting from the incorrect determination of the text line orientation may be removed according to the number of strokes obtained from the stroke projection.

It can be understood by those skilled in the art, the way for determining the noise text line by using the texture based method and/or the binary projection method is not limited to the specific ways described above.

In addition, to further improve processing speed, instead of performing further processing on all of the detected text lines, several detected text lines can be selected as candidate text lines and further processing is only performed on the candidate text lines. According to an embodiment of the present invention, steps based on a second scale binary image to be described in the following are performed only on N text lines with largest sizes among the text lines whose aspect ratios are larger than a predetermined threshold, wherein N≥1. According to a specific embodiment, the threshold of the aspect ratio is 3:1, for example. In addition, the height of the horizontal text line or the width of the vertical text line may be used as the size of the text line.

In the following, referring back to FIG. 1, in step S130, a second scale binary image is generated from the image, in which the second scale is larger than the first scale. According to an embodiment, the second scale is the original scale of the image. The binarization method used for generating the second scale binary image may be a method which is the same as or different from the method for generating the first scale binary image.

In addition, after the second scale binary image is generated, the previously detected text lines may further be processed for removing noise based on the second scale binary image. Similarly, the processing for removing noise based on the second scale binary image may also be performed using the texture based method and/or the binary projection method. However, as the texture based method requires a larger amount of calculation, in order to further improve the processing speed, one can employ only the binary projection based method for the second scale binary image to remove the noise text line. Therefore, according to an embodiment, after the step of generating the second scale binary image, there may further be a step of: based on the second scale binary image, estimating the confidence of the text line using the binary projection method, and removing as noise the text line whose confidence is lower than a predetermined level.

Next, in step S140, for each text line, a similarity between a corresponding section in the first scale binary image and a corresponding section in the second scale binary image is calculated, and the text line for which the similarity is lower than a predetermined level is removed as noise.

The step is mainly based on the following fact that, for a real text line, there is a high similarity between a binarization result on a small scale and a binarization result on a large scale, and for a noise text line, there is typically larger difference between the binary images on different scales or obtained by using different binarization methods.

Figure 5:
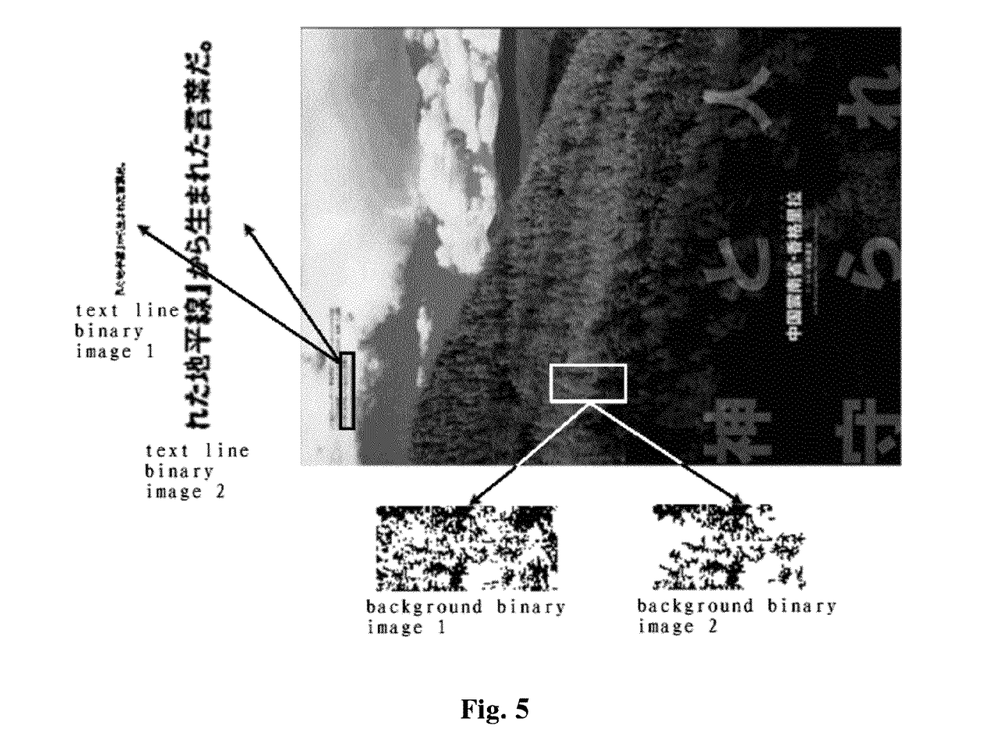
FIG. 5 is a schematic diagram showing an example of determining a noise text line based on a comparison between a first scale binary image and a second scale binary image.

For example, as shown in FIG. 5, for a text line, although the scales of the corresponding sections (e.g. a text line binary image 1 and a text line binary image 2 shown in the figure) of the text line in the first and second scale binary images are different, the similarity (i.e. shape matching degree) between the corresponding sections is high. However, for a background image section, the similarity between the corresponding sections (e.g. the background binary image 1 and the background binary image 2 shown in the figure) in the two binary images is low.

Therefore, the similarity between the two binarization results can be utilized to determine whether a text line is a noise text line.

As known by those skilled in the art, the similarity, namely the shape matching degree, may be characterized in various specific ways, for example, as described in the following references:

K. Siddiqi, A. Shokoufandeh, "Shock graphs and shape matching", International Journal of Computer Vision, 30, 1, 1999; and S. Belongie, J. Malik, J. Puzicha, "Shape context: a new descriptor for shape matching and object recognition", Neural Information Processing Systems (NISP), pp 831-837, 2000.

In the following, one specific embodiment of calculating the similarity between the corresponding sections in the first scale binary image and the second scale binary image and determining whether the corresponding text line is the noise text line according to the calculated similarity is given. Of course, the embodiment of step S140 is not limited thereto.

Assuming that $N_S$ represents the number of black pixel points in the first scale binary image. For each of the black pixel points in the first scale binary image, finding out the corresponding point in the second scale binary image. If the corresponding point is also a black pixel, or one of the four points including a point above the corresponding point, a point below the corresponding point, a point on the left of the corresponding point and a point on the right of the corresponding point is a black pixel, then the count of a counter $M_S$ increases by 1. Herein, $M_S$ represents a counting number for the points in the black pixel points of the first scale binary image for which matching points can be found out in the second scale binary image.

Similarly, assuming that $N_L$ represents the number of black pixel points in the second scale binary image. For each of the black pixel points in the second scale binary image, finding out the corresponding point in the first scale binary image. If the corresponding point is also a black pixel, or one of the four points including a point above the corresponding point, a point below the corresponding point, a point on the left of the corresponding point and a point on the right of the corresponding point is a black pixel, the the count of a counter $M_L$ increases by 1. Herein, $M_L$ represents a counting number for the points in the black pixel points of the second scale binary image for which matching points can be found out in the first scale binary image.

If $M_S > r_1 \times N_S$ and $M_L > r_2 \times N_L$, the corresponding text line is true, otherwise the corresponding text line is removed as noise, wherein $r_1 = r_2 = 0.9$, for example.

Referring back to FIG. 1, in step S150, for one or more of the remaining text line(s) which are not removed as the noise, optical character recognition (OCR) is performed on corresponding section(s) in the second scale binary image to determine character orientation(s) of corresponding text line(s).

Next, in step S160, the orientation of the image is determined according to the determined character orientation(s).

To improve the processing speed, the orientation of the whole image may be determined only according to the character orientations of a part of the text lines instead of all of the text lines. On the other hand, to improve the accuracy of orientation recognition, text lines which are most conducive to obtain a reliable optical character recognition result should be selected, and the orientation of the image is determined based on the character orientation of the selected text lines.

Therefore, according to an embodiment, prior to the step of determining the character orientation(s), there is further a step of determining, based on the second scale binary image, priority of the text line(s) according to one or more of the following factors: size of the text line; confidence of the text line determined based on texture; and grayscale variance of the text line.

The size of the text line may be a height of a horizontal text line or a width of a vertical text line. The larger the size of the text line is, the more conducive to perform optical character recognition. Therefore, the text line having larger size is given a higher priority.

The confidence of the text line determined based on the texture may be the text line confidence which is estimated using the texture based method and used as a reference for removing the noise text line as described above. The confidence is typically a number in the range of (−1, 1). For example, a larger confidence represents that the content is more likely to be a text line, and a smaller confidence represents that the content is more likely to be a background noise. Therefore, the text line having higher text line confidence is given a higher priority.

A larger grayscale variance of the text line implies a larger clarity of the characters in the text line, and thus it is more conducive to perform the optical character recognition. Therefore the text line having larger grayscale variance is given a higher priority.

One or more of these factors may be combined together by addition, multiplication or the like to determine the priority of the text line synthetically.

Accordingly, in the step of determining the character orientation(s), the character orientation(s) of the text line(s) may be determined sequentially in order of the determined priority.

In addition, according to an embodiment of the present invention, in the step of determining the orientation of the image according to the character orientation(s) of the text line(s), the orientation of the image may be determined by: voting according to the character orientations determined sequentially in order of the determined priority, and when a difference between the number of votes of the orientation with most votes and the number of the votes of the orientation with the second most votes reaches a predetermined threshold, determining the orientation of the image as the orientation with the most votes, and if it is not detected during voting that the difference of the number of votes reaches the predetermined threshold, then determining the orientation of the image as the orientation with most votes eventually.

For example, for the text lines sorted according to the priority, based on the second scale binary image, the optical character recognition is performed on the resulted images after the text line image is rotated by four directions (0°, 90°, 180°, 270°) respectively. A voting table may be established to accumulate the number of votes of each orientation. For each text line, the orientation with the highest average recognizing confidence in the optical character recognition is determined as the orientation of the text line, and one vote is given to the corresponding orientation, and the orientation with the most votes is recognized as the orientation of the whole image. Moreover, to further improve the processing speed, the difference between the number of votes of the orientation with the most votes and the number of votes of the orientation with the second most votes is monitored in real time, when the difference is larger than a predetermined value (e.g. 2), the recognizing of the follow-up text line(s) may not be performed any more, and the orientation with the most votes is determined as the recognition result for the orientation of the whole document image. If the difference of the number of votes is not detected to be larger than the predetermined value as above after voting on the orientations of all text lines, the orientation with most votes eventually is determined as the orientation of the whole document image.

Finally, in a case that no text line is detected by the steps above, an invert-color process may be performed on the image, and the same process as above is performed thereon.

Figure 6:
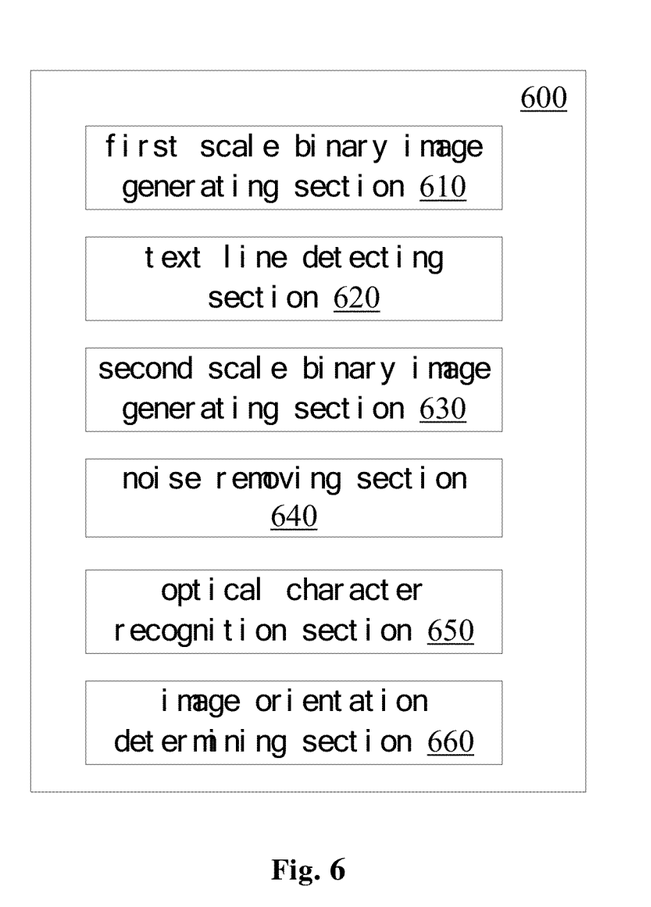
FIG. 6 is a block diagram illustrating an example of configuration of an image processing apparatus according to an embodiment of the present invention.

FIG. 6 is a block diagram illustrating an example of configuration of an image processing apparatus 600 according to an embodiment of the present invention.

The image processing apparatus 600 including: a first scale binary image generating section 610, a text line detecting section 620, a second scale binary image generating section 630, a noise removing section 640, an optical character recognition section 650 and an image orientation determining section 660.

The first scale binary image generating section 610 is configured to generate a first scale binary image from an image, in which the first scale is smaller than the original scale of the image;

The text line detecting section 620 is configured to detect at least one text line in the image based on the first scale binary image;

The second scale binary image generating section 630 is configured to generate a second scale binary image from the image, in which the second scale is larger than the first scale;

The noise removing section 640 is configured to, for each text line, calculate a similarity between a corresponding section in the first scale binary image and a corresponding section in the second scale binary image, and remove the text line for which the similarity is lower than a predetermined level as noise;

The optical character recognition section 650 is configured to perform optical character recognition on corresponding section(s) in the second scale binary image to determine character orientation(s) of the corresponding text line(s); and The image orientation determining section 660 is configured to determine the orientation of the image according to the character orientation(s).

According to an embodiment of the present invention, the image processing apparatus further includes a priority determining section configured to determine, based on the second scale binary image, priority of the text line(s) according to one or more of the following factors:

size of the text line;
confidence of the text line determined based on texture; and
grayscale variance of the text line, and
the optical character recognition section determines sequentially in order of the determined priority the character orientations of the text lines.

According to an embodiment of the present invention, the image orientation determining section includes a voting unit configured to vote according to the character orientations determined by the optical character recognition section sequentially, and the image orientation determining section is configured to, when a difference between the number of votes of the orientation with most votes and the number of the votes of the orientation with the second most votes reaches a predetermined threshold, determine the orientation of the image as the orientation with most votes, and determine the orientation of the image as the orientation with most votes eventually if it is not detected during voting that the difference of the number of votes reaches the predetermined threshold.

According to an embodiment of the present invention, the noise removing section is further configured to, based on the first scale binary image, estimate confidence of the text line using a texture based method and/or a binary projection method, and remove the text line whose confidence is lower than a predetermined level as noise.

According to an embodiment of the present invention, the noise removing section is further configured to, based on the second scale binary image, estimate the confidence of the text line using the binary projection method, and remove the text line whose confidence is lower than a predetermined level as noise.

The image processing apparatus according to an embodiment of the present invention further includes a text line filtering section configured to only select N text lines with largest sizes from the text lines whose aspect ratios are larger than a predetermined threshold, and the image processing apparatus only performs the process related to the second scale binary image on the text lines selected by the text line filtering section.

The image processing apparatus according to an embodiment of the present invention further includes a text block orientation detecting section configured to, in a case that a horizontal text line and a vertical text line detected by the text line detecting section overlap with each other, detect a text block orientation of the overlapping area based on the first scale binary image, and the noise removing section is further configured to remove the text line among the overlapped horizontal text line and vertical text line whose orientation is inconsistent with the text block orientation as noise.

By using the image processing method and apparatus according to the embodiments of the present invention, the amount of calculation required in the text line detection can be reduced significantly by performing the text line detection based on a small scale binary image, so that the processing speed is improved. Furthermore, the accuracy of the text line detection can be improved by removing the noise text line based on the comparison between the small scale binary image and the large scale binary image, thus the orientation of the whole document image is recognized with a higher accuracy.

Moreover, by performing the optical character recognition on the recognized text lines in order of the priority, and determining the orientation of the image according to the orientations of the text lines by voting, the speed of the image orientation recognition can be further improved with the recognizing accuracy being guaranteed.

It is known by those skilled in the art that the present invention may be embodied as an apparatus, a method or a computer program product. Therefore, the present invention may be implemented specifically in the following forms, that is, may be completely a hardware, a software (including a firmware, a resident software, a microcode or the like), or a combination of a software section and a hardware section. Further, the present invention may also be in a form of the computer program product which is embodied in any tangible expression medium in which a program code available for the computer is included.

Any combination of one or more computer readable media may be used. The computer readable medium may be a computer readable signal medium or a computer readable storage medium. For example, the computer readable storage medium may be, but not limited to, an electric, magnetic, optical, electromagnetic, infrared or semi-conductive system, apparatus, device or propagation medium, or any proper combination thereof. More specific examples (non-exhaustive list) of the computer readable storage medium include an electric coupling with one or more wires, a portable computer disk, a hard disk, a random access memory (RAM), a read only memory (ROM), an erasable programmable read-only memory (EPROM or flash memory), a fiber, a portable compact disk read-only memory (CD-ROM), an optical storage device, an magnetic storage device or any proper combination thereof. In the context herein, the computer readable storage medium may be any tangible medium that contains or stores a program used by or associated with the system, apparatus or device for executing an instruction.

The computer program code for performing the operations of the present invention may be written in any combination of one or more types of programming languages including the object oriented programming language, such as Java, Smalltalk and C++, and the general procedural programming language, such as C programming language and so on. The program code may be executed, completely on a computer of a user, partly on the computer of the user, as a single independent software packet, partly on the computer of the user and partly on a remote computer, or completely on the remote computer or server. In the latter case, the remote computer may be connected to the computer of the user via any type of network including a local area network (LAN) or an wide area network (WAN), or may be connected to an external computer (for example, via Internet by an internet service provider).

Figure 7:
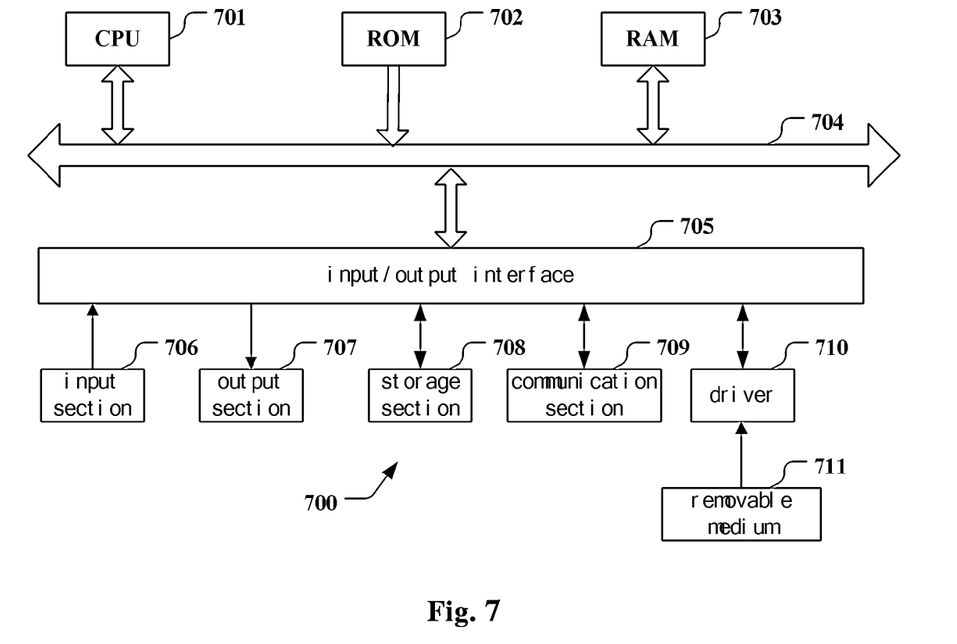
FIG. 7 is a block diagram showing an exemplary structure of a computer for implementing the method and apparatus according to the present invention.

FIG. 7 is a block diagram showing an exemplary structure of a computer 700 for implementing the method and apparatus according to the present invention.

In FIG. 7, a central processing unit (CPU) 701 performs various processes according to a program stored in ROM 702 or a program loaded from a storage section 708 to RAM 703. Data required when CPU 701 performs the various processes or the like is also stored in the RAM 703 as required.

CPU 701, ROM 702 and RAM 703 are connected with each other via a bus 704. An input/output interface 705 is also connected to the bus 704.

The following components are connected to the input/output interface 705: an input section 706 including a keyboard, a mouse or the like; an output section 707 including a display, such as a cathode ray tube (CRT) or a liquid crystal display (LCD), or a speaker; a storage section 708 including a hard disk or the like; and a communicating section 709 including a network interface card such as a LAN card or a modem. The communicating section 709 performs a communication process via a network such as Internet.

A driver 710 is also connected to the input/output interface 705 as required. On the driver 710, a removable medium 711 such as a disk, a compact disk, a magneto optical disk or a semiconductor memory is mounted as required, so that the computer program red from the removable medium 711 is installed into the storage section 708 as required.

In a case of implementing the above steps and processes by a software, a program for composing the software is installed from a network such as Internet or a storage medium such as the removable medium 711.

It should be understood by those skilled in the art, the storage medium is not limited to the removable medium 711 shown in FIG. 7 in which programs are stored and which is distributed separately from the method so as to provide the program to the user. The examples of the removable medium 711 include a disk, a compact disk (including a CD-ROM and a digital versatile disc (DVD)), a magneto optical disk (including a mini-disk (MD)) and a semiconductor memory. Alternatively, the storage medium may be ROM 702, a hard disk contained in the storage section 708 or the like, in which programs are stored and which is distributed to the user together with the method including the programs.

Equivalent substitutions of the corresponding structures, operations and all the apparatuses or steps defined by functions in the claims intend to include any structure or operation for performing the function in cooperation with other units indicated specifically in the claims. The object of the given description of the present invention is used for illustrating and describing, rather than exhaustive or to limit the present invention to the described forms. For those skilled in the art, it is obvious that many modifications and changes may be made without departing from the spirit and the scope of the present invention. The selections and explanations made to the embodiments intend to explain the principles and actual applications of the present invention in the best way for those skilled in the art to understand. For the present invention, there may be various embodiments with various changes which are adapted to the required specific purposes.

Excursuses:

Excursus 1. An image processing method, including steps of:

generating a first scale binary image from an image, wherein the first scale is smaller than the original scale of the image;

detecting at least one text line in the image based on the first scale binary image;

generating a second scale binary image from the image, wherein the second scale is larger than the first scale;

for each text line, calculating a similarity between a corresponding section in the first scale binary image and a corresponding section in the second scale binary image, and removing the text line for which the similarity is lower than a predetermined level as noise;

for one or more of the remaining text line(s), performing optical character recognition on corresponding section(s) in the second scale binary image to determine character orientation(s) of corresponding text line(s); and determining the orientation of the image according to the character orientation(s).

Excursus 2. The method according to excursus 1, wherein prior to the step of determining the character orientation(s), further including a step of determining, based on the second scale binary image, priority of the text line(s) according to one or more of the following factors:

size of the text line;

confidence of the text line determined based on texture; and grayscale variance of the text line, and in the step of determining the character orientations, the character orientations of the text lines are determined sequentially in order of the priority.

Excursus 3. The method according to excursus 2, wherein in the step of determining the orientation of the image according to the character orientation(s), the orientation of the image is determined by:

voting according to the character orientations determined sequentially in order of the priority, and when a difference between the number of votes of the orientation with most votes and the number of the votes of the orientation with the second most votes reaches a predetermined threshold, determining the orientation of the image as the orientation with most votes, and determining the orientation of the image as the orientation with most votes eventually if it is not detected during voting that the difference of the number of votes reaches the predetermined threshold.

Excursus 4. The method according to excursus 1, wherein the step of detecting the text line based on the first scale binary image further including: based on the first scale binary image, estimating the confidence of the text line using a texture based method and/or a binary projection method, and removing the text line whose confidence is lower than a predetermined level as noise.

Excursus 5. The method according to excursus 1, wherein after the step of generating the second scale binary image, further including the step of:

based on the second scale binary image, estimating the confidence of the text line using the binary projection method, and removing the text line whose confidence is lower than a predetermined level as noise.

Excursus 6. The method according to any one of excursuses 1-5, wherein the steps based on the second scale binary image are performed only for N text lines with largest sizes from the text lines whose aspect ratios are larger than a predetermined threshold, wherein $N \geq 1$.

Excursus 7. The method according to any one of excursuses 1-5, wherein the step of detecting the text lines based on the first scale binary image includes:

detecting horizontal text lines and vertical text lines based on the first scale binary image; and in case that a horizontal text line and a vertical text line that are detected overlap with each other, detecting a text block orientation of the overlapping area based on the first scale binary image, and removing the text line whose orientation is inconsistent with the text block orientation as noise.

Excursus 8. An image processing apparatus, including:

a first scale binary image generating section configured to generate a first scale binary image from an image, wherein the first scale is smaller than the original scale of the image;

a text line detecting section configured to detect at least one text line in the image based on the first scale binary image;

a second scale binary image generating section configured to generate a second scale binary image from the image, wherein the second scale is larger than the first scale;

a noise removing section configured to, for each text line, calculate a similarity between a corresponding section in the first scale binary image and a corresponding section in the second scale binary image, and remove the text line for which the similarity is lower than a predetermined level as noise;

an optical character recognition section configured to, for one or more of the remaining text line, perform optical character recognition on corresponding section(s) in the second scale binary image to determine character orientation(s) of the corresponding text line(s); and an image orientation determining section configured to determine the orientation of the image according to the character orientation(s).

Excursus 9. The apparatus according to excursus 8, further including a priority determining section configured to determine, based on the second scale binary image, priority of the text line(s) according to one or more of the following factors:

size of the text line;

confidence of the text line determined based on texture; and grayscale variance of the text line, and the optical character recognition section determines sequentially in order of the priority the character orientations of the text lines.

Excursus 10. The apparatus according to excursus 9, wherein the image orientation determining section includes a voting unit configured to vote according to the character orientations determined by the optical character recognition section sequentially in order of the priority, and the image orientation determining section is configured to, when a difference between the number of votes of the orientation with most votes and the number of the votes of the orientation with the second most votes reaches a predetermined threshold, determine the orientation of the image as the orientation with most votes, and determine the orientation of the image as the orientation with most votes eventually if it is not detected during voting that the difference of the number of votes reaches the predetermined threshold.

Excursus 11. The apparatus according to excursus 8, wherein the noise removing section is further configured to, based on the first scale binary image, estimate the confidence of the text line using a texture based method and/or a binary projection method, and remove the text line whose confidence is lower than a predetermined level as noise.

Excursus 12. The apparatus according to excursus 8, wherein the noise removing section is further configured to:

based on the second scale binary image, estimate the confidence of the text line using the binary projection method, and remove the text line whose confidence is lower than a predetermined level as noise.

Excursus 13. The apparatus according to any one of excursuses 8-12, further including a text line filtering section configured to select N text lines with largest sizes from the text lines whose aspect ratios are larger than a predetermined threshold, wherein N≥1, and the image processing apparatus is configured to perform the processes based on the second scale binary image on the text lines selected by the filtering section.

Excursus 14. The apparatus according to any one of excursuses 8-12, further including:

a text block orientation detecting section configured to, in case that a horizontal text line and a vertical text line detected by the text line detecting section overlap with each other, detect a text block orientation of the overlapping area based on the first scale binary image, and the noise removing section is further configured to remove the text line which is in the overlapped horizontal text line and vertical text line and whose orientation is inconsistent with the text block orientation as noise.

The invention claimed is:

1. An image processing method, comprising steps of:
generating a first scale binary image from an image, wherein the first scale is smaller than the original scale of the image;
detecting a plurality of text lines in the image based on the first scale binary image;
generating a second scale binary image from the image, wherein the second scale is larger than the first scale;
for each text line, calculating a similarity between a corresponding section in the first scale binary image and a corresponding section in the second scale binary image, and removing the text line for which the similarity is lower than a predetermined level as noise;
for one or more of the remaining text line(s), performing optical character recognition on corresponding section (s) in the second scale binary image to determine character orientation(s) of corresponding text line(s); and
determining the orientation of the image according to the character orientation(s),
wherein the detecting the text lines based on the first scale binary image comprises:
detecting a horizontal text line and a vertical text line based on the first scale binary image; and
detecting, in case that the horizontal text line and the vertical text line overlap with each other, a text block orientation of the overlapping area based on the first scale binary image, and removing the text line whose orientation is inconsistent with the text block orientation as noise.

2. The method according to claim 1, wherein prior to the step of determining the character orientation(s), further comprising a step of determining, based on the second scale binary image, priority of the text line(s) according to one or more of the following factors:
size of the text line;
confidence of the text line determined based on texture; and
grayscale variance of the text line, and
in the step of determining the character orientations, the character orientations of the text lines are determined sequentially in order of the priority.

3. The method according to claim 2, wherein in the step of determining the orientation of the image according to the character orientation(s), the orientation of the image is determined by:
voting according to the character orientations determined sequentially in order of the priority, and
when a difference between the number of votes of the orientation with most votes and the number of the votes of the orientation with the second most votes reaches a predetermined threshold, determining the orientation of the image as the orientation with most votes, and determining the orientation of the image as the orientation with most votes eventually if it is not detected during voting that the difference of the number of votes reaches the predetermined threshold.

4. The method according to claim 1, wherein the step of detecting the text line based on the first scale binary image further comprising: based on the first scale binary image, estimating the confidence of the text line using a texture based method and/or a binary projection method, and removing the text line whose confidence is lower than a predetermined level as noise.

5. The method according to claim 1, wherein after the step of generating the second scale binary image, further comprising the step of:
based on the second scale binary image, estimating the confidence of the text line using the binary projection method, and removing the text line whose the confidence is lower than a predetermined level as noise.

6. The method according to claim 1, wherein the steps based on the second scale binary image are performed only for N text lines with largest sizes from the text lines whose aspect ratios are larger than a predetermined threshold, wherein N≥1.

7. An image processing apparatus, comprising:
a first scale binary image generating section configured to generate a first scale binary image from an image, wherein the first scale is smaller than the original scale of the image;
a text line detecting section configured to detect a plurality of text lines in the image based on the first scale binary image;
a second scale binary image generating section configured to generate a second scale binary image from the image, wherein the second scale is larger than the first scale;
a noise removing section configured to, for each text line, calculate a similarity between a corresponding section in the first scale binary image and a corresponding section in the second scale binary image, and remove the text line for which the similarity is lower than a predetermined level as noise;
an optical character recognition section configured to, for one or more of the remaining text line, perform optical character recognition on corresponding section(s) in the second scale binary image to determine character orientation(s) of the corresponding text line(s); and an image orientation determining section configured to determine the orientation of the image according to the character orientation(s), wherein the text line detecting section is configured for:

detecting a horizontal text line and a vertical text line based on the first scale binary image; and in case that the horizontal text line and the vertical text line overlap with each other, detecting a text block orientation of the overlapping area based on the first scale binary image, and removing the text line whose orientation is inconsistent with the text block orientation as noise.

8. The apparatus according to claim 7, further comprising a priority determining section configured to determine, based on the second scale binary image, priority of the text line(s) according to one or more of the following factors:

size of the text line;

confidence of the text line determined based on texture; and grayscale variance of the text line, and the optical character recognition section determines sequentially in order of the priority the character orientations of the text lines.

9. The apparatus according to claim 8, wherein the image orientation determining section comprises a voting unit configured to vote according to the character orientations determined by the optical character recognition section sequentially in order of the priority, and the image orientation determining section is configured to, when a difference between the number of votes of the orientation with most votes and the number of the votes of the orientation with the second most votes reaches a predetermined threshold, determine the orientation of the image as the orientation with most votes, and determine the orientation of the image as the orientation with most votes eventually if it is not detected during voting that the difference of the number of votes reaches the predetermined threshold.

\* \* \* \* \*